D. A. FISKE.
RECIPROCATING-CHURN.

No. 193,151. Patented July 17, 1877.

WITNESSES:
H. Rydquist
J. H. Scarborough

INVENTOR:
D. A. Fiske.
BY
Munn & Co.
ATTORNEYS.

UNITED STATES PATENT OFFICE.

DANIEL A. FISKE, OF ST. LOUIS, MISSOURI.

IMPROVEMENT IN RECIPROCATING CHURNS.

Specification forming part of Letters Patent No. 193,151, dated July 17, 1877; application filed March 24, 1877.

*To all whom it may concern:*

Figure 1:
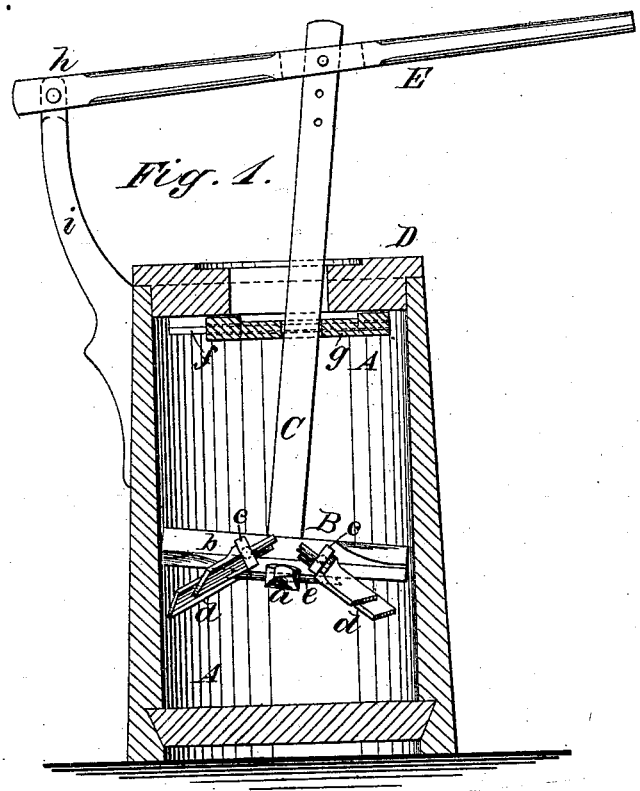
Figure 2:
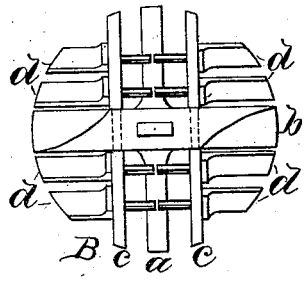
Figure 3:
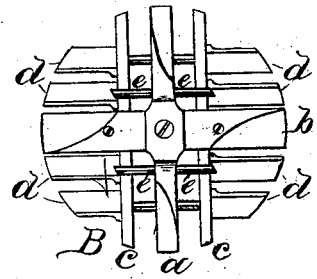
Figure 4:
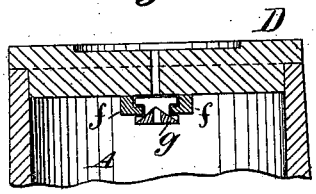

Be it known that I, DANIEL A. FISKE, of St. Louis, in the county of St. Louis and State of Missouri, have invented a new and Improved Churn, of which the following is a specification:

Figure 1 is a central vertical section of my improved churn. Figs. 2 and 3 are detail views of the churn-dasher. Fig. 4 is a vertical section.

Similar letters of reference indicate corresponding parts.

The invention will first be described in connection with the drawing, and then pointed out in the claim.

In the drawing, A is the body of the churn, and B the churn-dasher attached to the end of a flat rod, C. The dasher B consists of the bars $a$ $b$, which cross centrally at right angles, and are attached to the rod C. The bar $b$ is composed of two pieces of wood fastened together by screws or otherwise. In each of the pieces of the bar $b$ two semicircular grooves are cut, which form boxes for the rounded portion of the bars $c$.

To each of the bars $c$ wings $d$ are secured, which project at right angles to the said bars, and parallel to the bar $b$.

The tenons formed on the wings $d$, which pass through the bars $c$, are extended, so that they touch the bar $a$ when the said wings are in a horizontal position. Pins $e$ project from the bar $a$, and stop the downward movement of the wings $d$.

D is the cover of the churn, having a central slot, through which the dasher-rod C passes, and to the under side of which guides $f$ are attached for receiving a slide, $g$, in which is cut a slot that fits the dasher-rod. A portion of the center of the said slide is beveled or cut away, as shown in Fig. 4, to allow the cream that is carried up by the dasher-rod to run back into the churn.

The upper end of the dasher-rod is jointed to a lever, E, that is fulcrumed at $h$ to a bracket, $i$, that is attached to the side of the churn-body.

The wings $d$ and the ends of the bars $a$ $b$ are beveled or pitched, so that they cause the cream to rotate as the dasher is forced down.

When the dasher is raised, the wings $d$ turn down, as shown in Fig. 1, permitting the dasher to rise easily through the cream. When the dasher is forced downward, the wings are thrown up, and the inclined surfaces of the various portions of the dasher cause the cream to rotate. The upward motion of the dasher checks this rotation. The intermittent rotary motion of the cream is effective in separating the milk and butter, and the same motion tends to unite the particles of butter.

Having thus described my invention, I claim as new and desire to secure by Letters Patent—

The combination, with rod C, of centrally-crossing bars $a$ $b$, the former having pins $e$, the bars $c$, provided with rounded portion that fits grooves of bar $b$, and the floats or arms $d$, having tenons that pass through bars $c$ and touch bars $a$, as shown and described.

DANIEL A. FISKE.

Witnesses:
 ALBERT SMITH,
 J. H. COMBS.